United States Patent
Briscoe

(10) Patent No.: US 11,640,228 B2
(45) Date of Patent: May 2, 2023

(54) ACCESSING VIRTUALLY RENDERED DIGITAL CONTENT

(71) Applicant: Adobe Inc., San Jose, CA (US)

(72) Inventor: Matthew Thomas Briscoe, Provo, UT (US)

(73) Assignee: Adobe Inc., San Jose, CA (US)

( * ) Notice: Subject to any disclaimer, the term of this patent is extended or adjusted under 35 U.S.C. 154(b) by 84 days.

(21) Appl. No.: 17/142,661

(22) Filed: Jan. 6, 2021

(65) Prior Publication Data

US 2022/0214778 A1    Jul. 7, 2022

(51) Int. Cl.
  *G06F 3/0482* (2013.01)
  *G06F 21/10* (2013.01)
  *G06F 16/9535* (2019.01)
  *G06F 3/01* (2006.01)

(52) U.S. Cl.
  CPC ............ *G06F 3/0482* (2013.01); *G06F 3/011* (2013.01); *G06F 16/9535* (2019.01); *G06F 21/10* (2013.01); *G06F 2221/0713* (2013.01)

(58) Field of Classification Search
  CPC .... G06F 3/4082; G06F 16/9535; G06F 3/011; G06F 21/10; G06F 2221/0713
  See application file for complete search history.

(56) References Cited

U.S. PATENT DOCUMENTS

| | | | | |
|---|---|---|---|---|
| 8,887,290 | B1 * | 11/2014 | Denton | ............. G06F 21/10 726/26 |
| 2016/0048889 | A1 * | 2/2016 | Wachsberg | ........ G06Q 30/0214 705/14.72 |
| 2019/0046809 | A1 * | 2/2019 | Kang | ............. H01J 37/32449 |
| 2021/0097775 | A1 * | 4/2021 | Zurmoehle | ............. G06T 19/20 |

OTHER PUBLICATIONS

"Virtual Scoller Minutes", w3.org [retrieved Nov. 19, 2020]. Retrieved from the Internet <https://www.w3.org/2019/09/18-virtual-scroller-minutes.html#ResolutionSummary>., Sep. 18, 2019, 9 pages.

Mawani, Aleem , "How We Implemented Find-On-Page With Infinite Scroll", Streak Engineering Blog [retrieved Nov. 19, 2020]. Retrieved from the Internet <https://medium.com/streak-developer-blog/how-we-implemented-find-on-page-with-infinite-scroll-54bf31602118>., Apr. 10, 2013, 5 pages.

Schiemann, Dylan , "Next Generation Virtual Scrolling", sitepen [retrieved Nov. 19, 2020]. Retrieved from the Internet <https://www.sitepen.com/blog/next-generation-virtual-scrolling>., Sep. 25, 2019, 5 pages.

W3C Software, , "WICG / virtual-scroller", GitHub.com [retrieved Nov. 19, 2020]. Retrieved from the Internet <https://github.com/WICG/virtual-scroller>., 9 pages.

* cited by examiner

Primary Examiner — Kristie D Shingles
(74) Attorney, Agent, or Firm — FIG. 1 Patents

(57) ABSTRACT

Access techniques and systems for virtually rendered digital content are described. In one example, a collection of items of digital content is received that involves an operation of a computing device. As part of rendering the collection, the computing device generates an object model having nodes corresponding to the items in the viewable subset. The computing device then adds an additional node to the object model as a compact representation (e.g., as text) of other items of digital content that are not rendered. As a result, the compact representation supports operations involving digital content that is not currently rendered in the user interface.

20 Claims, 8 Drawing Sheets

ACCESSING VIRTUALLY RENDERED DIGITAL CONTENT

BACKGROUND

Computing devices support user interaction with ever increasing amounts of digital content. It is not uncommon for a typical user to interact with hundreds of digital documents, thousands of digital audio files, tens of thousands of digital images, and so forth on a single computing device. Although functionality of the computing device continues to expand to support this user interaction, in some instances operation of the computing device involving even hundreds of thousands of items of digital content limits an ability of the computing device to perform other tasks until that operation is completed or to even interact with items involved in that operation.

Consider an example in which a photographer has captured thousands of digital images and wishes to upload those digital images to a service provider system via a network, e.g., for storage "in the cloud," digital editing, and so forth. In this example, the computing device has sufficient processing, memory, and network resources to perform an upload operation as a single collection that addresses these thousands of digital images. However, conventional computing devices are not typically capable of rendering each of these items (and more particularly representations of the items) in a user interface during the upload. Consequently, conventional techniques have been configured to address this by rendering a subset of the digital content in the user interface, e.g., to show upload progress of those items. Other items of digital content "outside" this subset are not rendered and thus are not accessible for other operations of the computing device.

Continuing with the upload example, suppose the photographer wishes to check on an upload status for a particular digital image that is outside the range displayed in the user interface. Search functionality of the computing device is not capable of locating the digital image because it is not rendered. Consequently, the computing device does not support functionality expected by the photographer that is achievable in other instances in which a number of items of content being uploaded is capable of being rendered in the user interface and is thus searchable and otherwise accessible, e.g., by a browser. This challenge is exacerbated by collections of digital content that are created "on-the-fly" or user generated because this prevents use of conventional mitigation strategies by the computing device, examples of which include pagination and pre-indexing.

SUMMARY

Access techniques and systems for virtually rendered digital content are described. In one example, a computing device receives a collection of items of digital content involving an operation of a computing device, e.g., as representations of other digital content items involved in an upload. As part of rendering the digital content, the computing device determines a viewable subset of the collection and from this generates an object model having nodes corresponding to the items in the viewable subset.

The computing device then adds at least one additional node to the object model as a compact representation of other items of digital content that are not rendered in the user interface. The additional node, for instance, includes a list of items of digital content using separate lines of plain text that references information related to the items of digital content that are not rendered. Location of these representations within the list is then usable by the computing device to determine a scroll location of the item (e.g., based on relative location and line height) to then cause navigation to that item for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
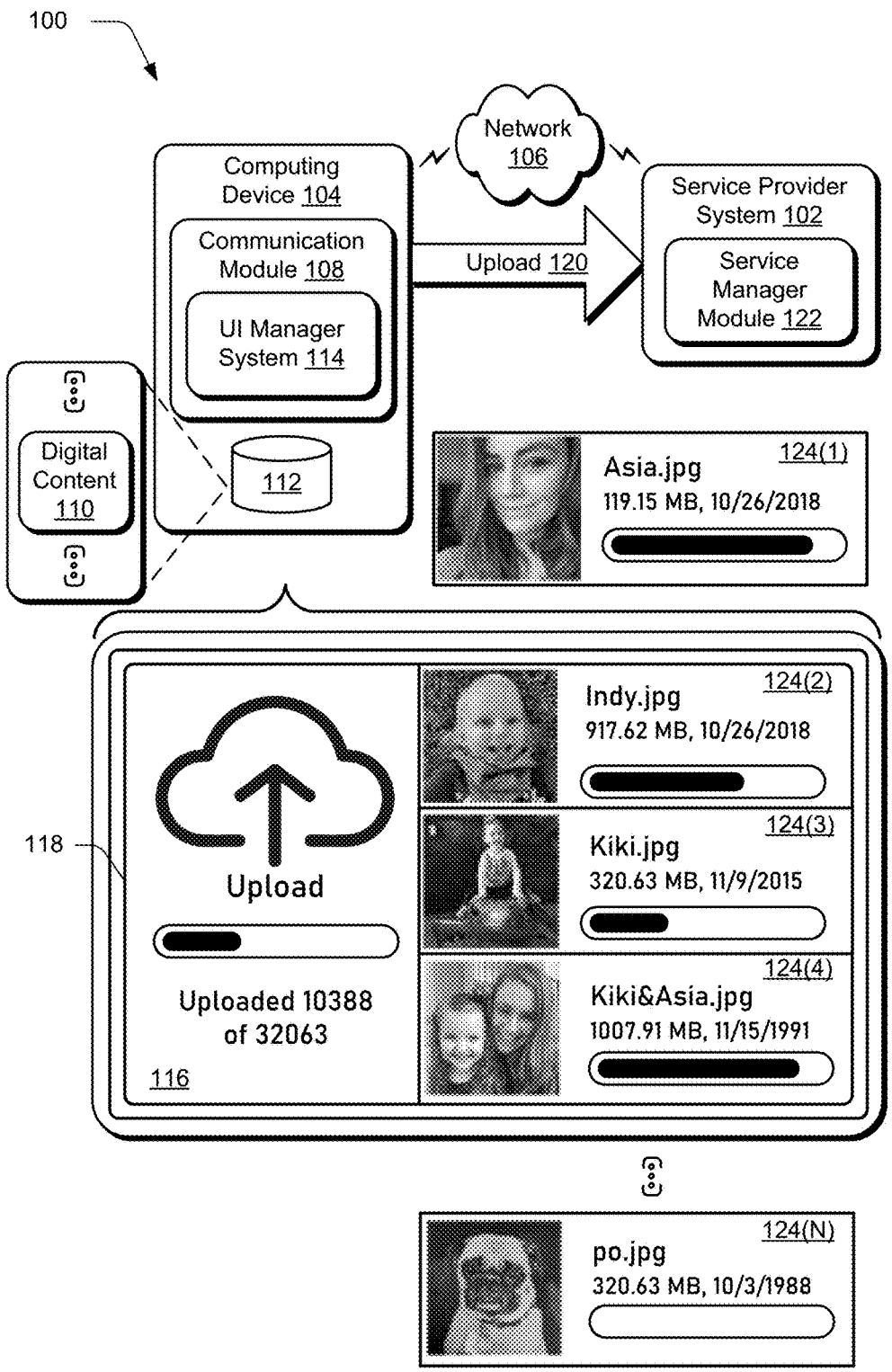
FIG. 1 is an illustration of an environment in an example implementation that is operable to employ virtually rendered digital content access techniques described herein.

Computing device operations that involve large numbers of items of digital content introduce challenges that in some instances cause performance of the computing device to depart from that expected by a user. Consider an example in which a user wishes to upload thousands of digital images to a service provider system via a network. The user accesses a network address of the service provider system using a browser executed on a computing device and initiates the upload by interacting with a user interface.

As part of this, items of digital content (e.g., icons which may include textual information related to each item) are displayed in the user interface that represents the digital images being uploaded. Thus, the items of digital content being rendered in this example represent other digital content (e.g., the digital images) being uploaded. In conventional instances involving large collections of items of digital content, rendering of each of the items by the browser for display in a user interface severely taxes computational resources of the computing device and thus causes failure of the device.

Conventional techniques address this by rendering a subset of the items that is "mounted" to the user interface. However, this results in an inability of the computing device to address items of digital content that are "unmounted." In one example, a range of the items are displayable in the user interface at a particular time. However, other items of digital content that are not in this range are not mounted and consequent are opaque to the browser as executed by the computing device. Thus, the other items are inaccessible for other functionality available from the browser, such as to support search, support an ability to scroll through significant portions of the list in real time, and so forth. Inaccessibility of this functionality is frustrating, causes operational failure of the computing device, and departs from user expectations regarding performance of the computing device.

Accordingly, access techniques and systems for virtually rendered digital content are described. In one example, a user interface (UI) manager system executed by a computing device receives a collection of items of digital content involving an operation of a computing device, e.g., as representations of other digital content items being uploaded by the computing device. As part of rendering the digital content, the UI manager system determines a viewable subset of the collection and from this generates an object model having nodes corresponding to the items in the viewable subset. The object model, for instance, is configured according to a document object model (DOM) having a plurality of nodes arranged in a logical tree that includes the items from the collection in the viewable subset.

The UI manager system then adds at least one additional node to the object model that includes a listing of a non-viewable subset of the collection of digital content. The collection of digital content, for instance, is configurable as an ordered list. As such, the viewable subset includes a range of the collection that is to be made viewable and rendered in a user interface, e.g., a middle portion of the list. The UI manager system then adds a first node to the object model that references a portion of the collection (e.g., as a first list) that is disposed before the viewable range and a second node to the object model that references a portion of the collection (e.g., as a second list) that is disposed after the viewable range. In this way, the first and second nodes function as a "compact representation" of the items of digital content that are not currently rendered without actually including the items, and thus reduces computational resource consumption and increases operation efficiency of the computing device. Further, the first and second nodes also support additional functionality that is lost in conventional techniques, such as to perform search. In this way, the UI manager system overcomes the computational limitations of conventional techniques to improve computing device operations, further discussion of which is included in the following sections and shown in corresponding figures.

Term Examples

"Digital content" is configurable in a variety of ways, examples of which include digital images, digital audio, digital video, digital media, digital files, digital documents, and so forth. Further, digital content is also representative of other types of digital content, e.g., as icons representing digital images, thumbnails representing digital videos, and so forth.

A "document object model" is an interface implementable across platforms and languages that treats markup languages such as XML and HTML as a tree structure in which each node of the structure represents portions of a document, i.e., digital content.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ virtual digital content access techniques described herein. The illustrated environment 100 includes a service provider system 102 and a computing device 104 that are communicatively coupled, one to another, via a network 106. Computing devices that implement these entities are configurable in a variety of ways.

A computing device, for instance, is configurable as a desktop computer, a laptop computer, a mobile device (e.g., assuming a handheld configuration such as a tablet or mobile phone as illustrated), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and discussed in some instances, a computing device is also representative of a plurality of different devices, such as multiple servers utilized by a business to perform operations "over the cloud" as implementing the service provider system 102 and as described in relation to FIG. 8.

The computing device 104 in this instance includes a communication module 108 that is configured to interact, manage, and/or edit digital content 110, which is illustrated as stored in a storage device 112. Examples of communication modules 108 include browsers, network-enabled applications, plug-in modules, and so forth that are executable by a processing system and storable in a computer-readable storage medium. The digital content 110 is also configurable in a variety of ways, including digital images, digital audio, digital video, digital media, digital files, digital documents, and so forth. Further, in the following discussion digital content is also representative of other types of digital content, e.g., as icons representing digital images, thumbnails representing digital videos, and so forth.

The communication module 108 includes a user interface (UI) manager system 114 that is configured to manage display of a user interface 116, which is illustrated as being rendered and displayed by a display device 118. The UI manager system 114 is configured to support UI and other functionality, even in instances in which operation of the computing device 104 involves large collections of digital content 110.

In the illustrated instance, the communication module 108 engages in an operation involving an upload 120 of a collection of digital content 110 to a service manager module 122 of a service provider system 102, e.g., for storage "in the cloud," social media, editing, and so forth. As previously described, operation of the computing device 104 can support a multitude of digital content 110 within a single collection, e.g., tens and even hundreds of thousands of items.

During this upload, the UI manager system 114 is tasked with outputting other digital content 124(1), 124(2), 124(3), . . . , 124(N) to represent a status of this operation, i.e., as icons representing the digital content 110 and an upload status in real time. However, operation of the computing device 104 may fail in conventional techniques when attempting to render the digital content 124(1)-124(N) in the user interface 116 in instances involving very large quantities.

Conventional techniques used to address this technological challenge, however, introduce additional technological challenges that can also cause failure of the computing device 104. In one conventional example, custom search handlers are implemented to replace or augment built-in search functionality, e.g., of a browser. An additional search control, for instance, is added that listens for keyboard events based on text inputs and then iterates through raw data to scroll to a location identified from the raw data to then render a node. While this supports search functionality, it has performance considerations, such as to maintain multiple lists, programmatically maintaining a virtual cursor position, and how to show highlighted text. This approach also lacks consideration or usefulness for accessibility, as unmounted nodes are rendered after the triggering search event.

In another instance, techniques are used to also render a portion of the nodes that would otherwise be disposed adjacent to nodes rendered in the user interface, e.g., to support scrolling to these nodes with reduced lag. However, this technique also involves digital content that is not rendered and thus is also not accessible to other functionality of the computing device, e.g., search. Another issue is at initial load this technique can take a significant amount of time to perform due to parsing of HTML content to determine whether nodes are "truly mounted." Thus, this technique also fails in instances involving large collections of digital content.

To overcome these technical and operational challenges of computing devices, techniques are described herein to support digital content accessibility during operations of a computing device involving large collections of digital content. The UI manager system 114, for instance, is configured to keep digital content 124(1)-124(N) accessible during performance of operations of the computing device 104 involving that content. To do so, the UI manager system 114 generates an object model (e.g., a document object model) having nodes of items of digital content for rendering in the user interface 116, e.g., digital content 124(2)-124(4). Additional nodes are added to this object model that include compacted representations (e.g., a list) of the items of digital content that is not rendered in the user interface, e.g., digital content 124(1), 124(N). These additional nodes include line delimiters and style-defined offsets such that operations involving digital content "outside" of what is currently being rendered is supported by the computing device 104.

In a search example, an item of digital content that is not mounted and thus "outside" the range of what is being rendered results in correct behavior in determining a scroll location of that item because the compacted additional node maintains a correct relative position of each of the items of digital content 124(1)-124(N). Accordingly, alignment of separate descriptions (e.g., as separate lines of text) of the digital content within the additional nodes is achieved with computationally inexpensive styles such that each unmounted node is referenced by a single line within the additional node(s). Line height is used to determine spacing by the UI manager system 114 and from this scroll positions of each of the items of digital content that are not currently rendered. In this way, the UI manager system 114 provides a technical solution to the technical problems of conventional techniques to address operations involving large quantities of digital content. Further discussion of these and other examples is included in the following sections and shown using corresponding figures.

In general, functionality, features, and concepts described in relation to the examples above and below may be employed in the context of the example procedures described in this section. Further, functionality, features, and concepts described in relation to different figures and examples in this document are interchanged among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Virtual Digital Content Rendering Access Techniques

Figure 2:
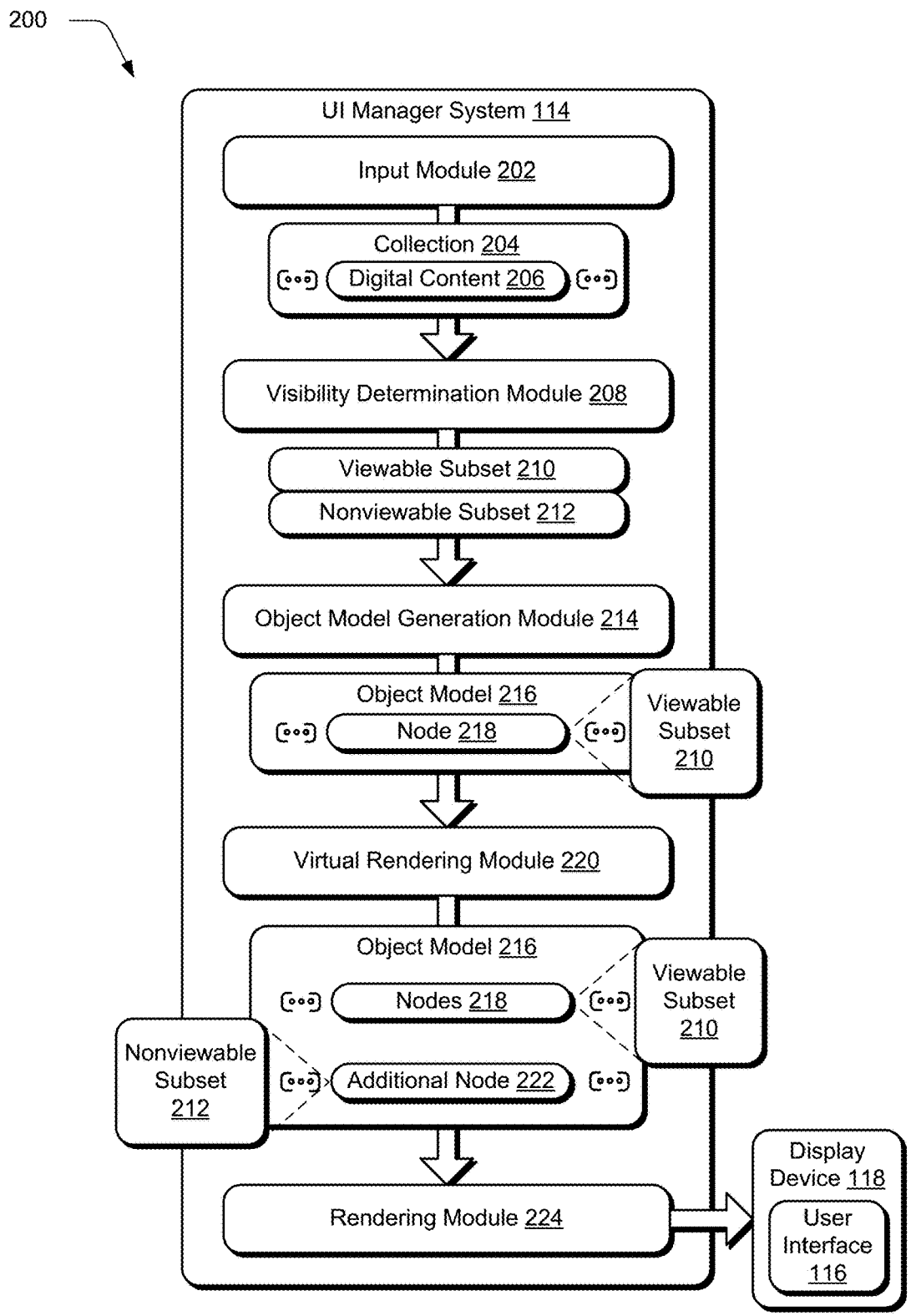
FIG. 2 depicts a system in an example implementation of a user interface manager system of FIG. 1 as generating an object model having additional nodes including listings of digital content included in a collection that is not rendered.
Figure 3:
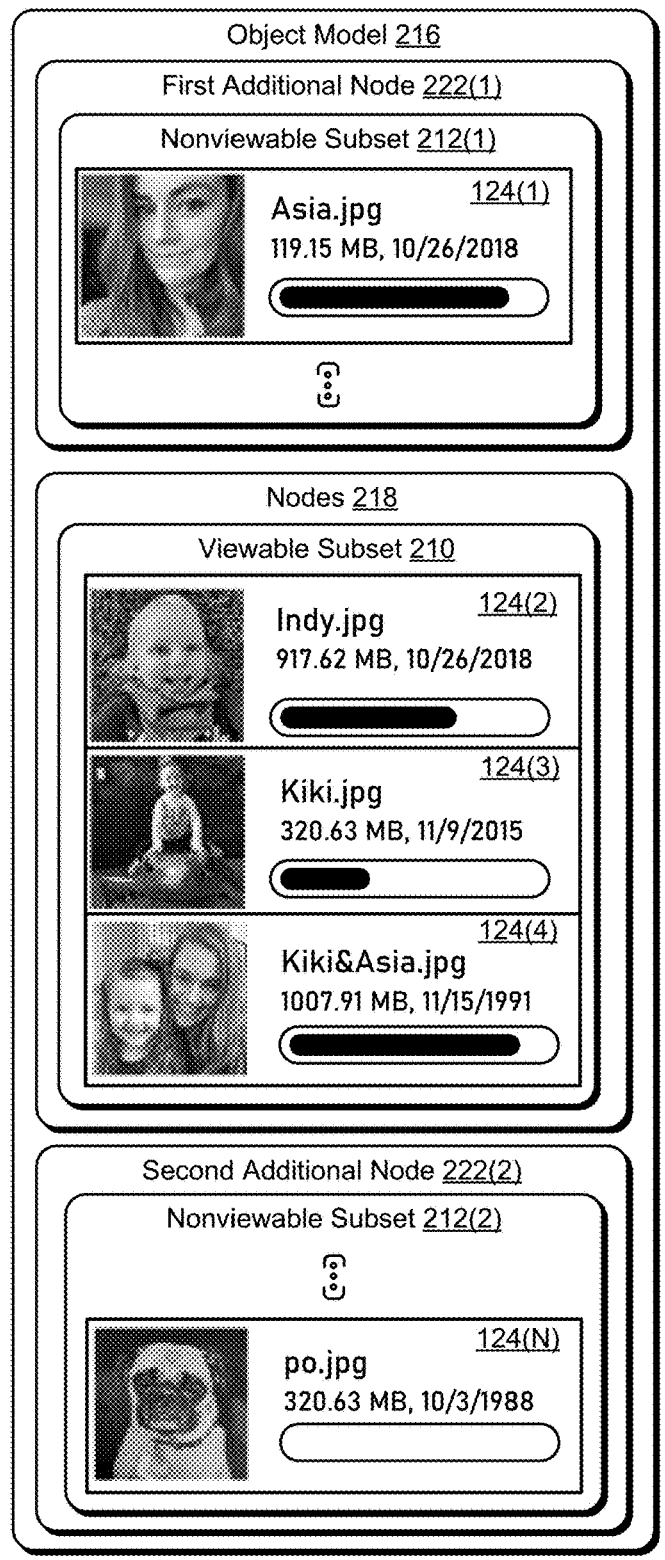
FIG. 3 is an illustration of an example implementation of an object model generated in accordance with the techniques of FIG. 2.
Figure 4:
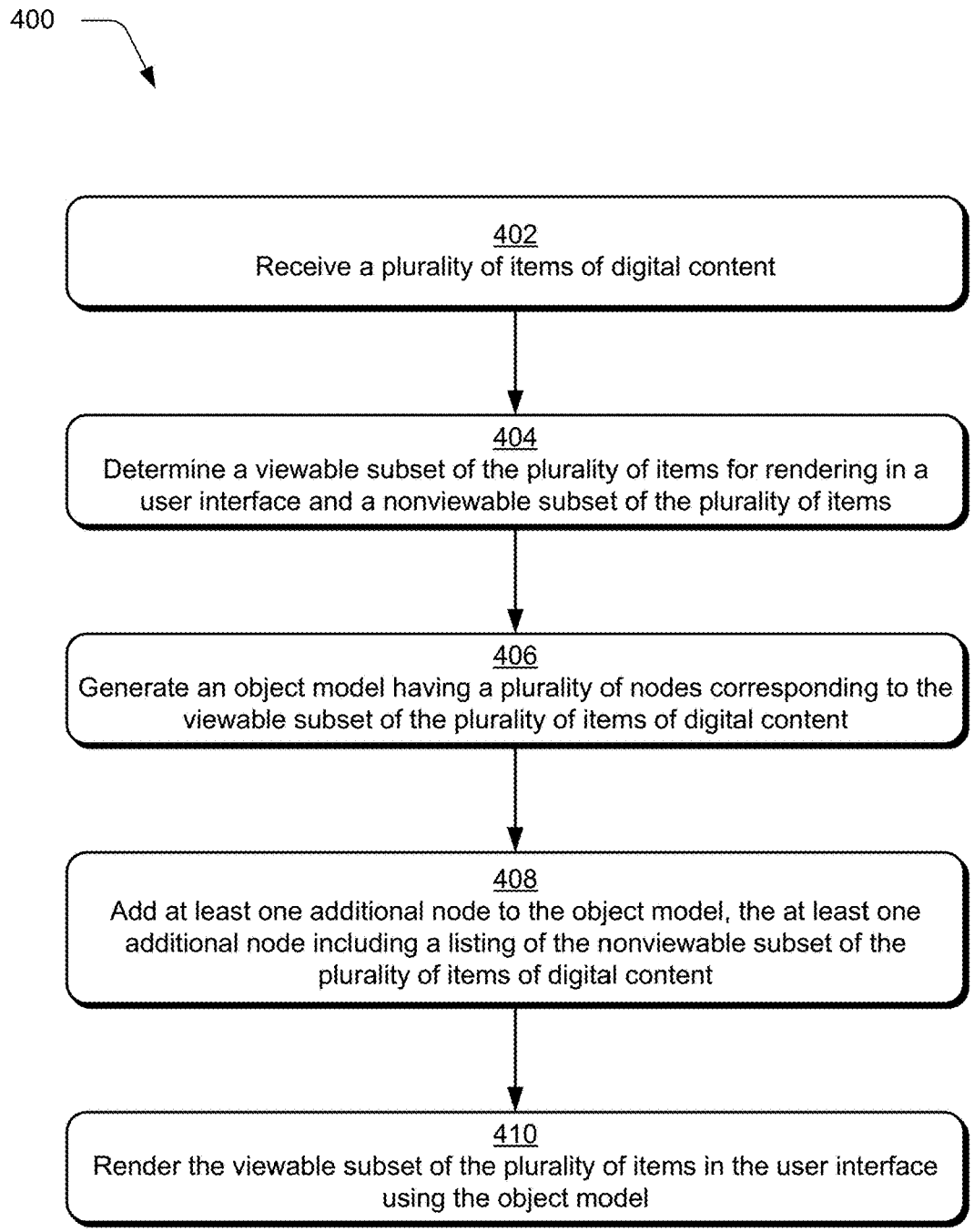
FIG. 4 is a flow diagram depicting a procedure in an example implementation in which techniques are described to enable operations of a computing device to address collections of digital content.

FIG. 2 depicts a system 200 in an example implementation of the user interface manager system 114 of FIG. 1 as generating an object model having additional nodes referencing digital content included in a collection that is not rendered. FIG. 3 is an illustration of an example implementation of an object model generated in accordance with the techniques of FIG. 2. FIG. 4 depicts a procedure 400 in an example implementation in which techniques are described to enable operations of a computing device to address large collections of digital content.

The following discussion describes techniques that may be implemented utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

To begin in this example, a plurality of items of digital content are received (block 402) by an input module 202 of the UI manager system 114. As illustrated, the input module 202 receives a collection 204 of a plurality of items of digital content 206. Digital content 206 is configurable in a variety of ways, including digital images, digital audio, digital video, digital media, digital files, digital documents, and so forth. Further, digital content 206 is also representative of other types of digital content, e.g., as icons representing digital images, thumbnails representing digital videos, and so forth. A number of items of digital content 206 included in the collection 204 ranges from one or more items to even hundreds of thousands of items.

The digital content 206 included in the collection 204, for instance, is received by the input module 202 as representative (e.g., as icons) of digital content 110 being uploaded 120 over a network 106 to a service provider system 102. Other examples are also contemplated, such as local transfer, editing, movement of the digital content 110 within a storage device 112 local to the computing device 104, or any other operation of the computing device 104 configured to address a plurality of digital content 110, e.g., collectively.

The collection 204 of digital content 206 is passed from the input module 202 to a visibility determination module 208 of the UI manager system 114. The visibility determination module 208 is configured as part of the UI manager system 114 to determine a viewable subset 210 of the plurality of items for rendering in a user interface 116. The visibility determination module 208 is also configured to determine a nonviewable subset 212 of the plurality of items (block 404). The visibility determination module 208, for instance, determines how many of the items of digital content 206 from the collection are viewable in a user interface 116 at any one time, e.g., based on a display size (e.g., number of pixels) of the items to be used to display the items as specified as part of the collection 204.

The visibility determination module 208 also determines a location within the collection 204 that is to be displayed. When the collection 204 is initially received by the visibility determination module 208, for instance, the viewable subset 210 begins at a first sequentially ordered item of digital content 206 in the collection 204 and includes additional items of the digital content 206 from the collection 204 that are viewable concurrently in the user interface 116. The nonviewable subset 212 includes those items of digital content 206 from the collection 204 that are not part of the viewable subset 210, i.e., are not to be rendered for display in the user interface 116. The viewable subset 210 and nonviewable subset 212 is updated by the visibility determination module 208 based on navigation through the collection as further described in relation to FIGS. 5-7.

Data describing the viewable subset 210 and the nonviewable subset 212 is passed from the visibility determination module 208 to an object model generation module 214. The object model generation module 214 is configured to generate an object model 216 having a plurality of nodes 218 corresponding to the viewable subset of the plurality of items of digital content (block 406). The object model 216, for instance, is configured to include nodes 218 for representing each item of digital content in the viewable subset 210 as a document object model (DOM).

The object model 216, as a DOM, is configured as a tree structure where each node 218 represents each item of digital content 206 as part of a hierarchical structure. Conventionally, for rendering as part of an HTML page in a browser, the nodes 218 are organized in a tree structure (e.g., DOM tree) with the topmost node named as a document object. When this HTML page is then rendered in browsers using conventional techniques, the browser downloads the HTML document into local memory and automatically parses it to display the page on a display device. However, rendering each of the nodes in conventional techniques for collections having a multitude of items as previously described causes operation of the browser and corresponding computing device to fail.

Accordingly, in this example, a viewable subset 210 of the digital content 206 is used to generate nodes 218 of the object model 216. In an implementation, the viewable subset 210 also includes nodes that are not currently rendered in the user interface 116, but are included in the subset to promote rendering efficiency during navigation. As such, the viewable subset is not limited to simultaneous rendering at any one time of each of the nodes included in the subset, but rather refers to a subset of the collection 204, a portion of which includes at least one item of digital content 206 that is rendered for display.

The object model 216 is passed from the object model generation module 214 to a virtual rendering module 220. The virtual rendering module 220 is configured to perform virtual rendering by adding at least one additional node 222 to the object model 216 as a compacted representation. The at least one additional node 222, for instance, includes a listing of the nonviewable subset 212 of the plurality of items of digital content 204 (block 408) from the collection 204. In one example, the listing is configured as delineated text from the digital content as a compacted representation, e.g., names used by corresponding icons to represent digital content being uploaded. In one example, this is configured such that the additional node 222 includes a reference to each item of digital content 206 that is included in the nonviewable subset 212 in a corresponding line. Line height spacing is usable to determine a scroll position of the digital content referenced by the additional node 222 to support operations of the computing device 104 that are not possible using conventional techniques, such as search, even though the digital content 206 is not currently rendered.

Consider an example for a collection 204 of items of digital content configured as a sequentially ordered list of "x=[x0, x1, x1000]," the UI manager system 114 is configured to maintain a listing of the entire collection 204, yet renders a subset "n=[n0, n1, . . . , n5]," i.e., the viewable subset 210. The viewable subset 210 "n" in this example contains the items of digital content 206 (i.e., the viewable subset 210) that are to be rendered into "true nodes" inside a visible area of the user interface 116, which are represented as nodes 218 of the object model 216.

Suppose the viewable subset 210 "n" in this example includes nodes 218 for digital content in a range of "x500-x505." The virtual rendering module 220 is then used to generate additional nodes 222 as compacted representations of digital content within the nonviewable subset 212, e.g., digital content items "x0-x499" and "x506-x1000." To do so, a first additional node is generated as including a compacted representation using text as a list of digital content items "x0-x499." As such, the first additional node functions as a compact representation of digital content items "x0-x499" without actually containing the items, themselves. A second additional node also includes a compacted representation using text as a list of digital content items "x506-x1000." These additional nodes are not rendered for display in the UI.

Each item of digital content in this example as referenced in the additional nodes 222 is listed as a single line of text with a line height that corresponds to a rendered height of a node 218 of the object model 216. For example, if nodes 218 in the viewable subset 210 are to be rendered as having a height of 50 px, a line height of 50 px high is also specified for the lines of text in the additional nodes 222 in order to establish corresponding position and thereby support navigation in the user interface 116 to and between these items.

The additional nodes 222 are placed within the object model 216 by the virtual rendering module 220 based on their corresponding locations, sequentially, with respect to the nodes 218 of the viewable subset 210, i.e., with respect to the ordered collection 204. The first node includes a list of digital content items "x0-x499" in this example is set at "top:0" and the second additional node includes a list of digital content items "x506-x1000" is set at "bottom:0." In this way, the absolutely positioned first and second additional nodes function to replace 994 nodes that otherwise would have been rendered using conventional techniques and as such improves computational and memory storage efficiency and operation of the computing device 104. Further, the listing within the additional nodes exposes the digital content to operations supported by the computing device 104, even though not rendered in the user interface 116.

As shown in the example implementation 300 of FIG. 3, the object model 216 includes a first additional node 222(1) corresponding to the nonviewable subset 212(1), which includes a listing of text referencing a single item of digital content 124(1), but does not include the item of digital content itself. The object model 216 also includes nodes 218 of the viewable subset 210 for rendering of digital content 124(2)-124(4). A second additional node 222(2) is disposed sequentially within the object model 216 and includes a listing of items of digital content through the item of digital content 124(N). Other examples are also contemplated, such as a single node including a listing of an entirety of the collection, an entirety of the nonviewable subset 212 regardless of where positioned with respect to the viewable subset 210, and so on.

The object model 216 as including nodes 218 and at least one additional node 222 is then passed from the virtual rendering module 220 to a rendering module 224. In response, the viewable subset 210 of the plurality of items of digital content is rendered using the object model 216 (block 410) by the rendering module 224 for display in a user interface 116 by a display device 118. By maintaining the additional nodes 222 as part of the object model 216, other functionality such as search is accessible for digital content 206 that is not rendered in the user interface 116 which is not possible using conventional techniques, further discussion of which is included in the following description.

Figure 5:
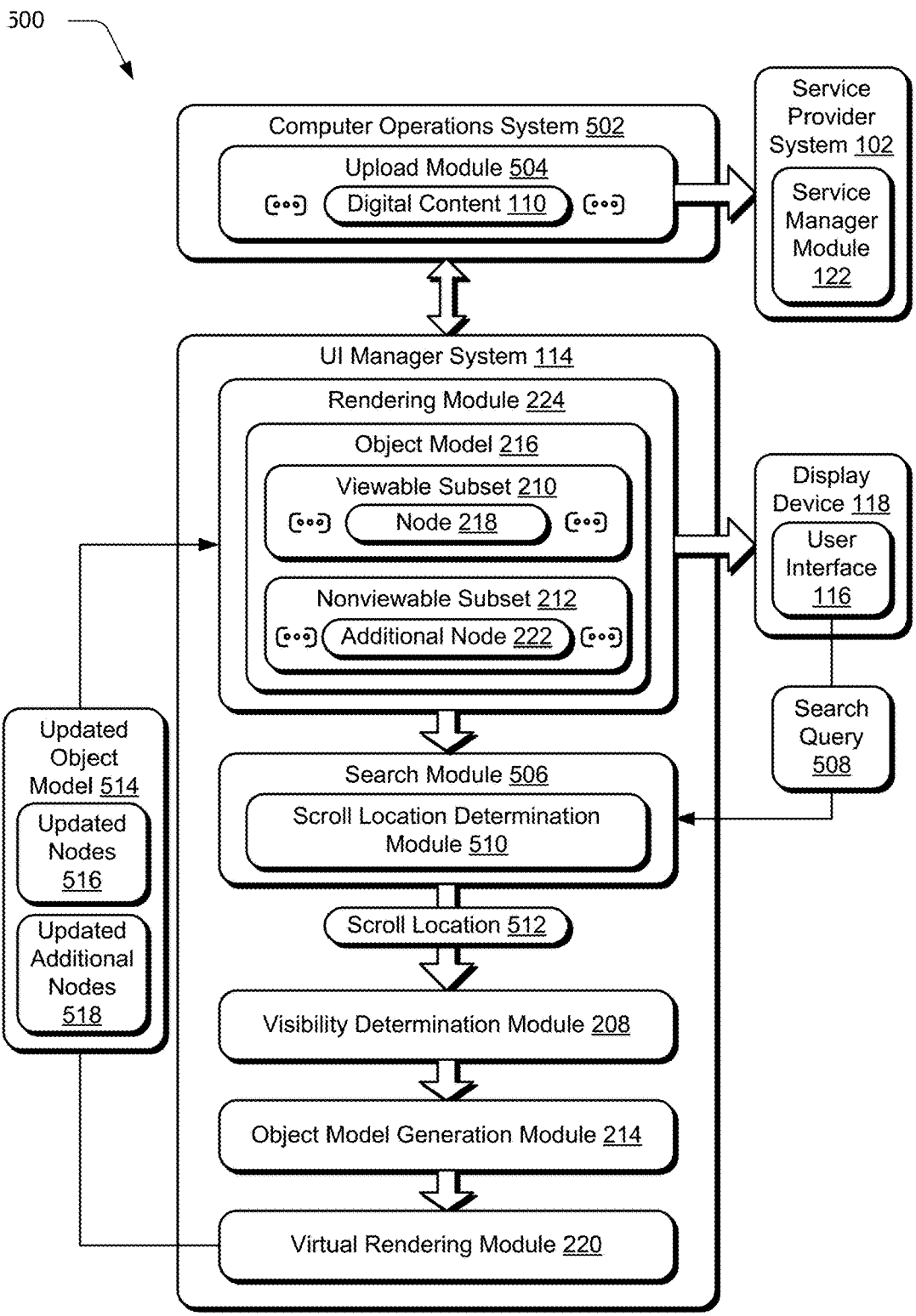
FIG. 5 depicts an example implementation showing operation of a user interface manager module of FIG. 1 during an upload operation as supporting search and update of an object model to support navigation.
Figure 6:
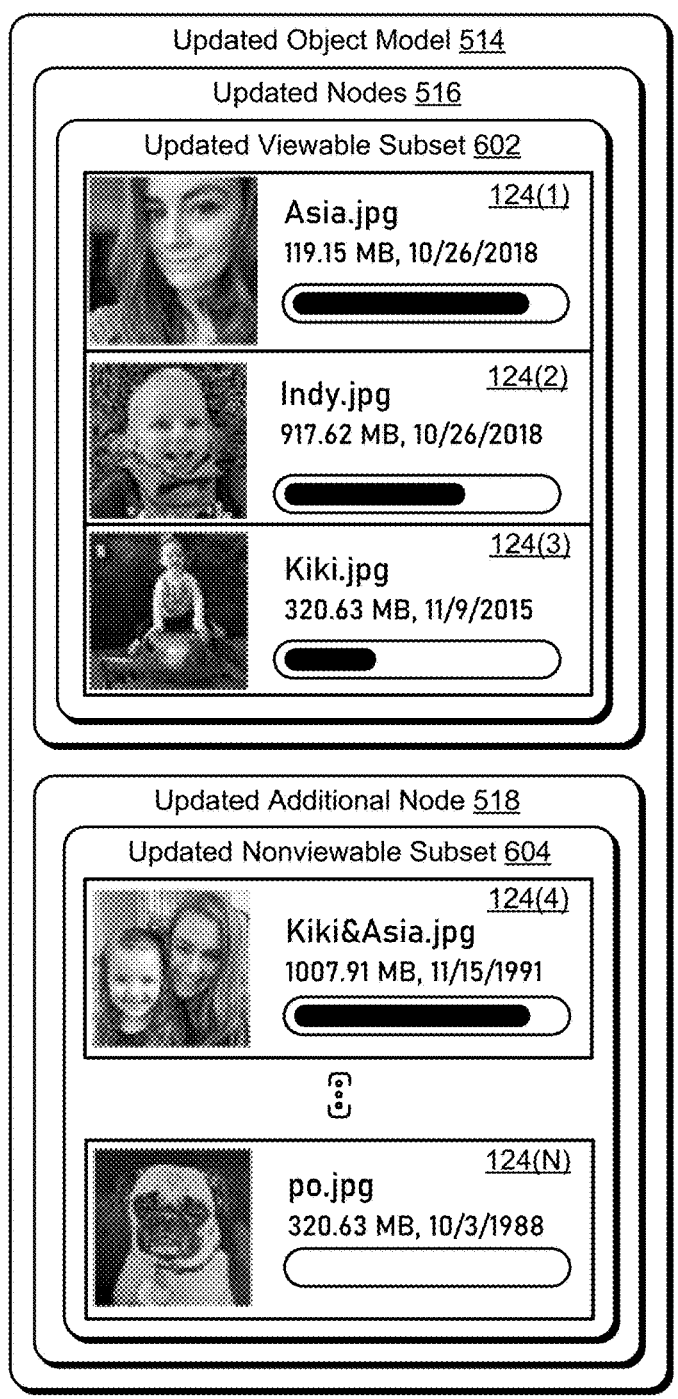
FIG. 6 depicts an example in which an object model of FIG. 3 is updated based on user interface navigation resulting from a search.
Figure 7:
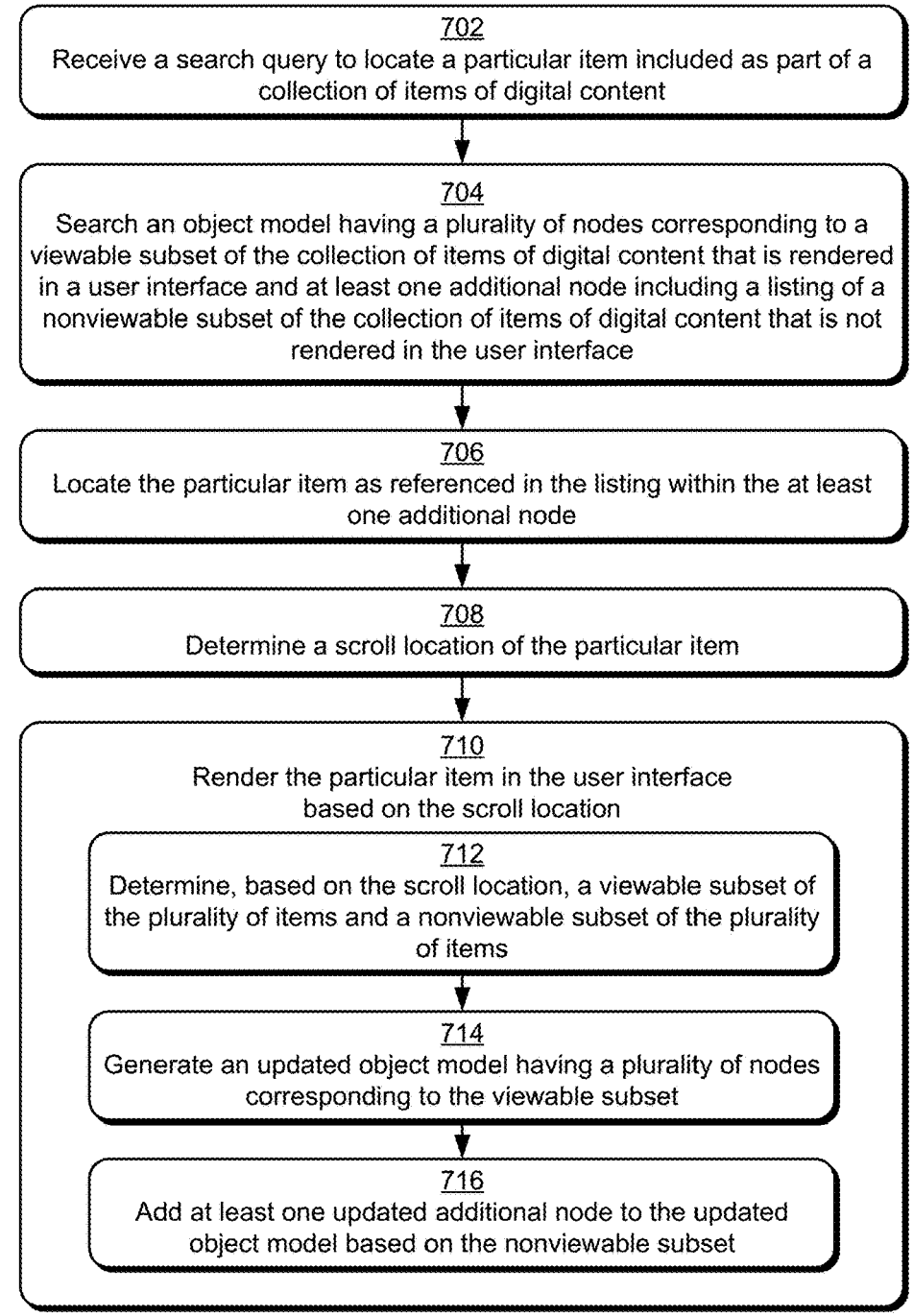
FIG. 7 is a flow diagram depicting a procedure in an example implementation in which additional nodes of an object model that reference digital content that is not rendered in a user interface are leveraged to support search functionality during upload of digital content.

FIG. 5 depicts an example implementation 500 showing operation of the UI manager module 114 during an upload operation as supporting search and update of an object model to support navigation. FIG. 6 depicts an example 600 in which the object model 114 of FIG. 3 is updated based on user interface navigation resulting from a search. FIG. 7 depicts a procedure 700 in an example implementation in which additional nodes reference digital content that is not rendered in a user interface are leveraged to support search functionality during upload of digital content.

As illustrated in FIG. 5, a computer operations system 502 is shown that is representative of an ability of the computing device 104 to perform operations. The operations include use of instructions that are executable through hardware functionality of the computing device 104, such as a processing system and computer readable storage medium. Thus, a wide range of operations are implemented by the computer operations system 502.

An example of these operations is illustrated as an upload module 504 that is configured to implement upload 120 a plurality of items of digital content 110 via a network 106 to a service manager module 122 of a service provider system 102. The upload 120, for instance, may include tens and even hundreds of thousands of items of digital content 110 for communication to the service manager module 122, e.g., as part of a content storage digital service, content sharing digital service, social media service, and so forth.

During this upload 120, an object model 216 is generated as described in relation to FIGS. 2-4 to generate additional digital content 124(1)-124(N) indicating a status of the upload 120 of the digital content 110, e.g., as icons. The object model 216 includes "true" nodes 218 that are used to render a viewable subset 210 of the digital content and at least one additional node 222 including a text listing of a nonviewable subset 212 of the digital content 124(1)-124(N).

As previously described, conventional techniques used to address large collections of digital content for rendering in a user interface while also maintaining performance and ensuring accessibility of all items failed. However, inclusion of the additional nodes 222 in the object model 216 as a compact representation of digital content that is not rendered in the user interface is employed by the UI manager system 114 to make this functionality available, which otherwise would not be the case.

In an example involving search, a search module 506 receives a search query 508 via a user interface 116 to locate a particular item included as part of a collection of items of digital content (block 702). During the upload of the digital content 110, for instance, a user input is received to determine an upload status of a particular item of digital content 110. Accordingly, digital content 110(1) (e.g., an icon) referencing that status is to be located in the object model 216.

In response, the search module 506 searches the object model 216 used to render the viewable subset 210 of the collection of items of digital in the user interface 116 for the particular item, digital content 124(1). In the example of FIG. 3, the viewable subset 210 includes digital content 124(2), 124(3), 124(4). The object model 216 also includes at least one additional node having a listing of a nonviewable subset of the collection of items of digital content that is not rendered in the user interface (block 704). Again referring to FIG. 3, this is illustrated as a first additional node 222(1) including a text reference to a nonviewable subset 212(1) including digital content 124(1) and a second additional node 222(2) referencing a nonviewable subset 212(2) including digital content up to digital content 124(N).

In this example, the particular item (e.g., digital content 124(1)) is located in the object model 216 as referenced in the listing within the at least one additional node (block 706). The search of the object model 216, for instance, includes a search of text associated with nodes 218 in the viewable subset 210 as well as the text included in the additional nodes 222(1), 222(2). The search ultimately locates the corresponding text referencing the particular item (e.g., digital content 124(1)) in a list included in the first additional node 222(1). Thus, the digital content 124(1) is not currently rendered in this example, but is still locatable through use of the listings using text in the additional nodes 222(1), 222(2).

Once located, a scroll location determination module 510 is used to determine a scroll location 512 of the particular item (block 708), e.g., digital content 124(1). In a sequential listing example, a location of the reference to the item in the listing is used to determine a relative location of that item with respect to what is being rendered. Line heights (e.g., 50 px in the example above) are then used based on the location to determine the scroll location 512, e.g., based on number of references (i.e., line items) between the particular item and rendered items multiplied by the line height. Other examples are also contemplated, such as defined locations included within the additional node 222 with respect to the user interface 116, and so forth.

The particular item (e.g., digital content 124(1)) is then rendered in the user interface 116 based on the scroll location 512 (block 710). Following the example above as described in relation to FIG. 2, a determination is made, based on the scroll location, by a visibility determination module 208 of a viewable subset of the plurality of items and a nonviewable subset of the plurality of items (block 712). From this, an updated object model is generated having a plurality of nodes corresponding to the viewable subset (block 714) by an object model generation module 214. At least one additional node is also added to the updated object model by a virtual rendering module 220 based on the nonviewable subset (block 716). The updated object model 514 having the updated nodes 516 and updated additional nodes 518 is then used as a basis by the rendering module 224 to render the particular item (e.g., digital content 124(1)) based on the scroll location 512, which may include other items of digital content as permitted by the user interface 116.

As depicted in an example implementation 600 of FIG. 6, the particular item of digital content that is the subject of the search query is digital content 124(1). Accordingly, this item along with digital content 124(2), 124(3) is included in the updated nodes 516 as forming an updated viewable subset 602 of the collection of digital content. The updated additional node 518 includes updated nonviewable subset 604, which in this case includes references to digital content 124(4), . . . , digital content 124(N). In this way, through use of a compact representation of digital content that is not rendered in the user interface, the techniques described herein support operations that previously were not possible using conventional techniques and further may do so in real time as a result of operational efficiencies gained from these techniques as described above.

Example System and Device

Figure 8:
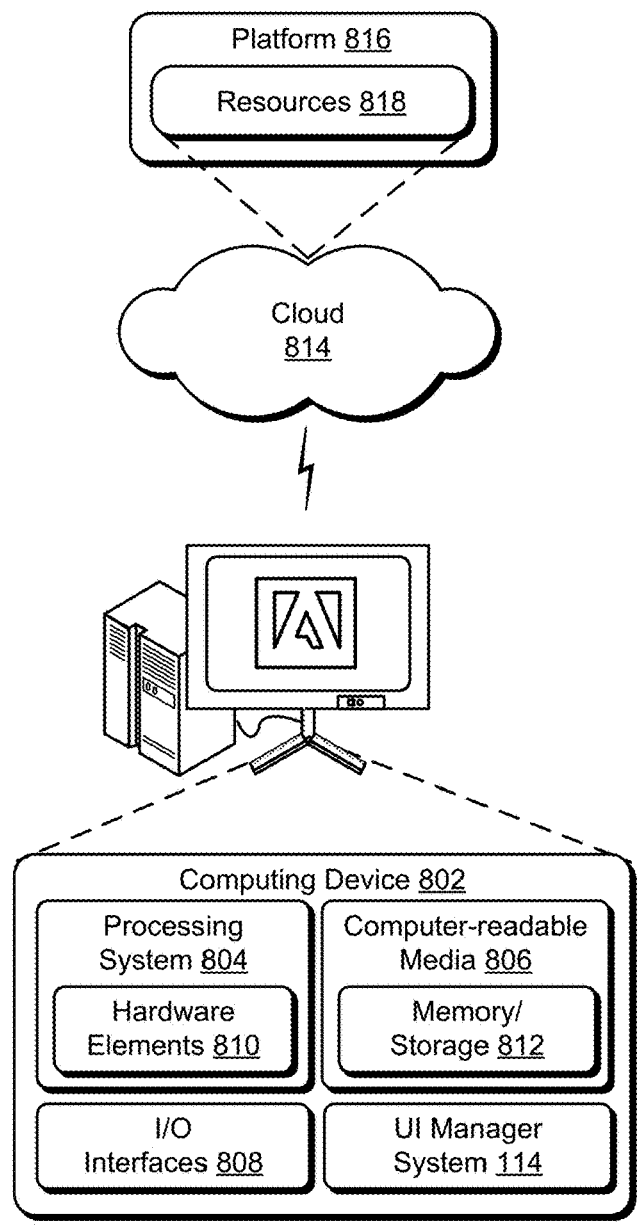
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the UI manager system 114. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    receiving, by a computing device, a search query to locate a particular item included as part of a collection of items of digital content;
    searching, by the computing device, an object model having:
        a plurality of nodes corresponding to a viewable subset of the collection of items of digital content that is rendered in a user interface; and
        at least one additional node including a listing of a nonviewable subset of the collection of items of digital content that is not rendered in the user interface;
    locating, by the computing device responsive to the searching, the particular item as referenced in the listing within the at least one additional node based on a location of the particular item within the listing of the plurality of items of digital content that is not rendered in the user interface;
    determining, by the computing device, a scroll location of the particular item responsive to the locating; and
    rendering, by the computing device, the particular item in the user interface based on the scroll location.

2. The method as described in claim 1, wherein the object model is a dynamic object model.

3. The method as described in claim 1, wherein the listing of the nonviewable subset of the collection of items of digital content specifies respective scroll positions, one to another, of the plurality of nonviewable subset of the plurality of items with respect to the user interface.

4. The method as described in claim 1, wherein the collection is an ordered list of the items of digital content.

5. The method as described in claim 4, wherein the at least one additional node includes:
    a first said additional node including a portion of the nonviewable subset of the collection of items of digital content that is disposed in the ordered list before the plurality of nodes corresponding to a viewable subset; and
    a second said additional node including a portion of the nonviewable subset of the collection of items of digital content that is disposed in the ordered list after the plurality of nodes corresponding to a viewable subset.

6. The method as described in claim 1, further comprising:
receiving the collection of items of digital content as part of a request to upload the collection via a network; and
uploading the collection of items of digital content.

7. The method as described in claim 6, wherein the receiving the search query, the searching, the locating, the determining, and the rendering are performed during the uploading of the collection.

8. The method as described in claim 1, wherein the items of digital content are icons displayable in the user interface.

9. In a digital medium environment to render digital content, a system comprising:
an input module implemented at least partially in hardware of a computing device to receive a plurality of items of digital content;
a visibility determination module implemented at least partially in hardware of the computing device to determine a viewable subset of the plurality of items for rendering in a user interface and a nonviewable subset of the plurality of items;
an object model generation module implemented at least partially in hardware of the computing device to generate an object model having a plurality of nodes corresponding to the viewable subset of the plurality of items of digital content;
a virtual rendering module implemented at least partially in hardware of the computing device to add at least one additional node to the object model, the at least one additional node including a listing of the nonviewable subset of the plurality of items of digital content, the at least one additional node supporting a scroll location of a particular item within the listing that is not rendered in the user interface; and
a rendering module implemented at least partially in hardware of the computing device to render the viewable subset of the plurality of items in the user interface using the object model.

10. The system as described in claim 9, wherein the object model is a dynamic object model (DOM).

11. The system as described in claim 10, wherein the DOM is generated from a markup language document generated responsive to the receiving.

12. The system as described in claim 9, wherein the plurality of items of digital content are arranged as an ordered list.

13. The system as described in claim 12, wherein the at least one additional node includes:
a first said additional node including a portion of the nonviewable subset of the plurality of items of digital content that is disposed in the ordered list before the plurality of nodes corresponding to a viewable subset; and
a second said additional node including a portion of the nonviewable subset of the plurality of items of digital content that is disposed in the ordered list after the plurality of nodes corresponding to a viewable subset.

14. The system as described in claim 9, wherein the items of digital content are icons displayable in the user interface.

15. A system comprising:
means for receiving a search query to locate a particular item included as part of a collection of items of digital content;
means for searching an object model having:
a plurality of nodes corresponding to a viewable subset of the collection of items of digital content that is rendered in a user interface; and
at least one additional node including a listing of a nonviewable subset of the collection of items of digital content that is not rendered in the user interface;
means for determining a scroll location of the particular item responsive to locating the particular item as referenced in the listing within the at least one additional node, the scroll location of the particular item is based on a location of the particular item within the listing of the plurality of items of digital content that is not rendered in the user interface; and
means for rendering the particular item in the user interface based on the scroll location.

16. The system as described in claim 15, wherein the object model is a dynamic object model.

17. The system as described in claim 15, wherein the listing of the nonviewable subset of the collection of items of digital content specifies respective scroll positions, one to another, of the plurality of nonviewable subset of the plurality of items with respect to the user interface.

18. The system as described in claim 15, wherein the collection is an ordered list of the items of digital content.

19. The system as described m claim 18, wherein the at least one additional node includes:
a first said additional node including a portion of the nonviewable subset of the collection of items of digital content that is disposed in the ordered list before the plurality of nodes corresponding to a viewable subset; and
a second said additional node including a portion of the nonviewable subset of the collection of items of digital content that is disposed in the ordered list after the plurality of nodes corresponding to a viewable subset.

20. The system as described in claim 15, wherein the items of digital content are icons displayable in the user interface.

* * * * *